United States Patent [19]

Trobec et al.

[11] Patent Number: 4,782,308
[45] Date of Patent: Nov. 1, 1988

[54] CIRCUIT ARRANGEMENT OF A READING DEVICE FOR ELECTROMAGNETIC IDENTIFICATION CARDS

[75] Inventors: Franc Trobec, Trzic; Marko Zivlakovic, Kranj; Miro Rozman, Bled; Joze Zmavc, Kropa; Vital Erzen, Dobrova, all of Yugoslavia

[73] Assignee: Iskra-Sozd Elektrokovinske Industrije n.sol.o, Ljubljana, Yugoslavia

[21] Appl. No.: 22,691

[22] Filed: Mar. 6, 1987

[30] Foreign Application Priority Data

Mar. 7, 1986 [YU] Yugoslavia ............................ 340/86
Feb. 27, 1987 [YU] Yugoslavia ............................ 314/87

[51] Int. Cl.$^4$ .............................................. G06K 5/00
[52] U.S. Cl. ...................................... 331/65; 235/380; 331/158; 331/167; 340/825.72

[58] Field of Search ................... 331/65, 167, DIG. 3, 331/158; 340/505, 542, 552, 825.31, 825.34, 825.54, 825.55, 825.72; 324/57 Q, 236; 361/182; 235/380, 381, 382, 382.5

[56] References Cited

U.S. PATENT DOCUMENTS 3,842,324 10/1974 Atkins ............................. 331/65 X
4,546,241 10/1985 Walton ............................. 235/380

Primary Examiner—Siegfried H. Grimm
Attorney, Agent, or Firm—Fleit, Jacobson, Cohn & Price

[57] ABSTRACT

A circuit arrangement of a reading device for electromagnetic identification cards having inverters connected in parallel and an LC resonant circuit forming a transmitting oscillator which is influenced by the identification card to change the amplitude of an oscillating signal in order to recognize approach thereto of the card. Detection of the signal amplitude change is utilized to form pulses for subsequent data processing in which the influence of distance between the identification card and the reading device is minimized.

5 Claims, 3 Drawing Sheets

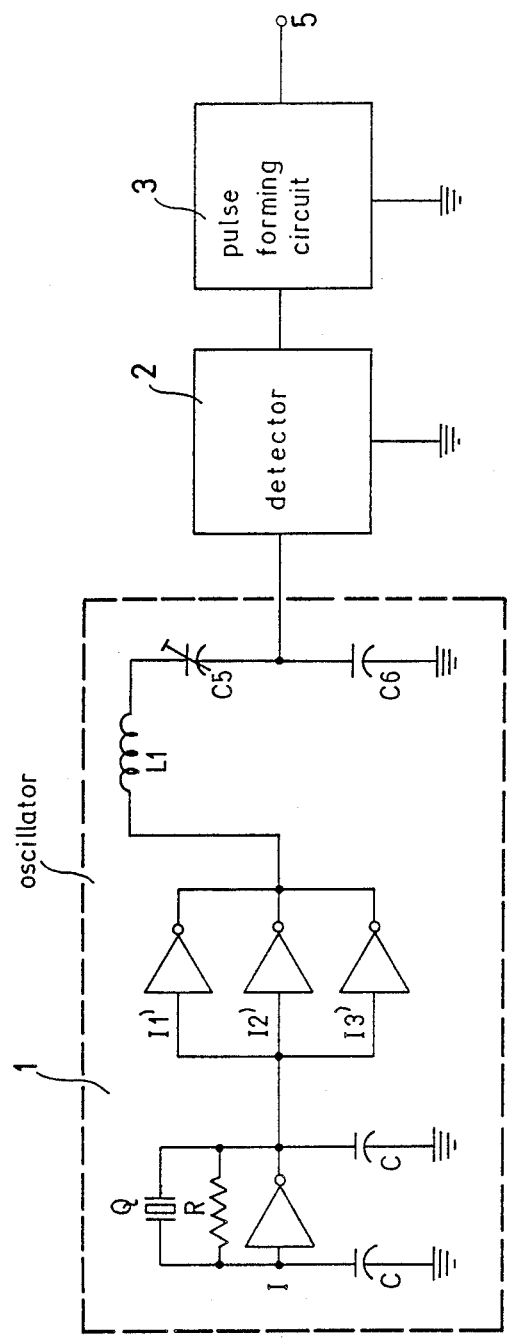

4,782,308

CIRCUIT ARRANGEMENT OF A READING DEVICE FOR ELECTROMAGNETIC IDENTIFICATION CARDS

BACKGROUND OF THE INVENTION

This invention relates generally to a circuit arrangement of a reading device for electromagnetic identification cards.

According to comparable card reading systems already known in the art, the identification card being read is made from magnetic, semiconductor or electromagnetic materials or components. By comparison, the electromagnetic card offers the advantage of a contactless reading operation since the card is neither touched by a pick-up device nor by any contacts clamped thereto. Thus, a certain distance will always exist between the reading device and the identification card to avoid mechanical wear.

Despite the foregoing favorable characteristic associated with electromagnetic identification cards, the reading devices already known in the art for use therewith hve certain disadvantages. To obtain a reliable reading of such electromagnetic card, a relatively expensive circuit arrangement was heretofore required, involving the supply of voltage from a separate power source because of the usual low 5-volt supply used for such a reading device which is not sufficient to produce a strong enough high frequency signal necessary to control the reading of the card. An additional disadvantage of prior reading devices for electromagnetic identification cards, is the dependence of the identification process on the distance between the card and the reading device since the distance adversely affects operational reliablility.

It is therefore an important object of the present invention to provide a reading device for electromagnetic identification cards that is economical and minimizes the influence of distance between the reading device and the identification card on the identification process.

An additional object of the invention is to eliminate the disadvantages of electromagnetic card reading devices by means of a reading circuit arrangement that is less costly and operable by one supply voltage, and without requiring any precise distance between the identification card and the reading device.

SUMMARY OF THE INVENTION

In accordance with the present invention, an inductance coil through its inductive coupling with an electromagnetic identification card, changes the impedance of its resonance circuit, frequency turned to the card to vary an oscillating signal amplitude of the oscillator associated therewith. Signal inverters associated with the oscillator transmit the oscillating signal to a signal amplitude detector. According to certain embodiments, the resonance circuit of the oscillator includes a quartz crystal to provide frequency stability. In yet another embodiment, an adjustable capacitor in the LC network of the resonance circuit is utilized to adjustably tune the resonance frequency of the quartz crystal in order to minimize the influence of distance between the card and the inductance coil of the oscillator.

The amplitude effect of the card on the signal generated by the oscillator is detected and applied through the detector to an input of a comparator in a pulse-forming circuit having signal inverters coupling the output of the comparator to an output terminal from which readable signal data is extracted. The output of the detector is coupled by an RC network to the positive, feedback input of the comparator while a grounded RC network is connected to the negative input of the comparator.

BRIEF DESCRIPTION OF THE DRAWING FIGURES

The foregoing objectives of the invention are achieved by circuit arrangements described in detail hereinafter and as illustrated in the drawings, in which:

FIG. 3 is a circuit diagram showing a modified form of the transmitting oscillator in accordance with a third embodiment of the invention.

Figure 1:
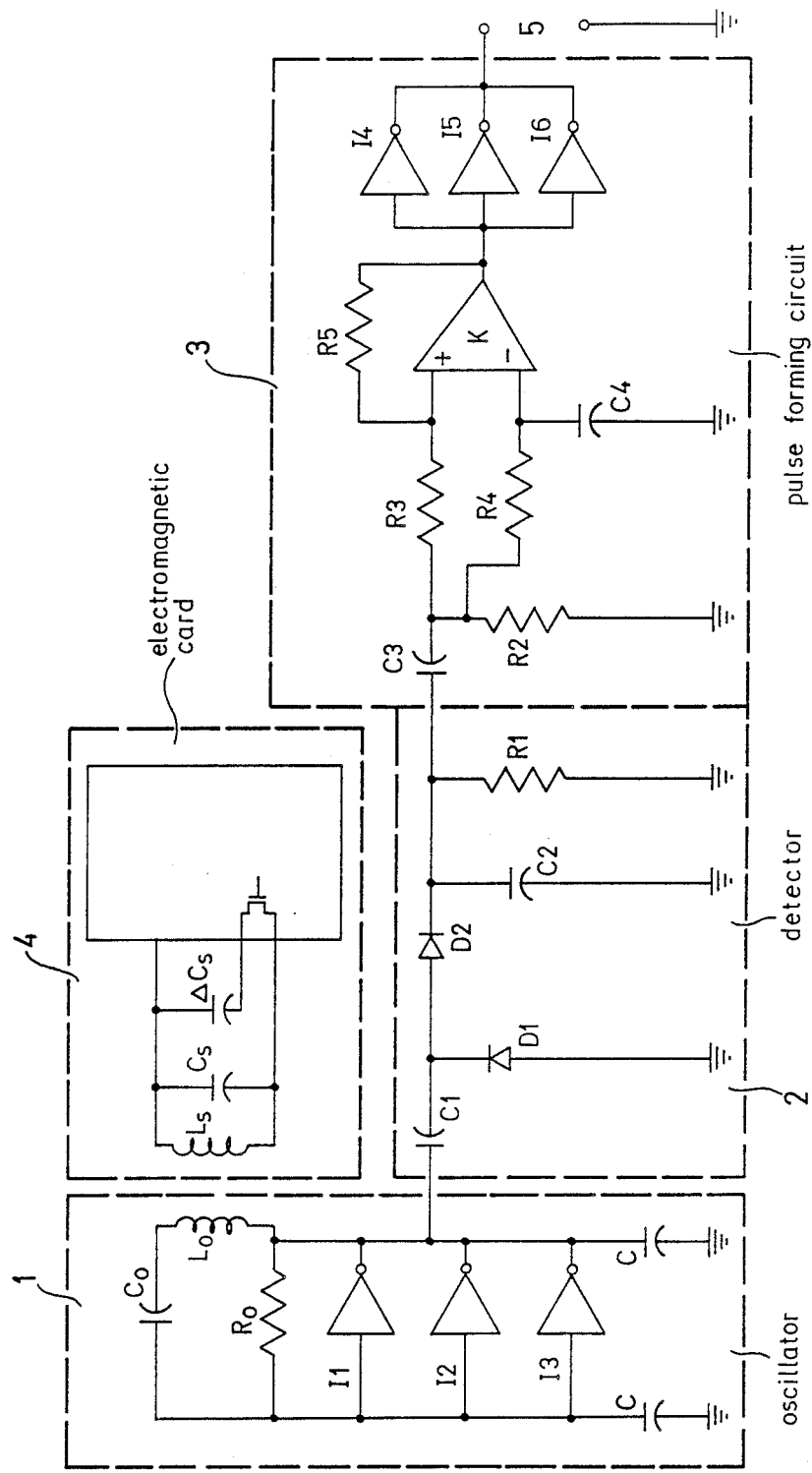
FIG. 1 is a circuit diagram of the reading device according to one embodiment of the invention.

DETAILED DESCRIPTION OF PREFERRED EMBODIMENTS;

In FIG. 1, a circuit arrangement of a reading device for electromagnetic cards 4 is shown comprising an oscillator 1, a detector 2 and a pulse-forming circuit 3. The oscillator includes three parallel connected inverters I1, I2 and I3 in series with a resonance circuit formed by a coil $L_o$, a capacitor $C_o$ and resistor $R_o$. The inverters I1, I2 and I3 are connected in parallel with the resistor $R_o$, with their inputs and outputs respectively connected to ground through two capacitors C so that the supply voltage to the oscillator, derived in a manner well known in the art, is exclusively used for the generation of the oscillating signal. When the identification card 4 approaches the reading circuit arrangement, the coil Ls of its resonance circuit is inductively coupled with the coil $L_o$ producing a change in the oscillation signal amplitude, appearing at the junction of the outputs of the inverters I1, I2 and I3 to which the detector 2 is connected for detection of such change in signal amplitude.

The amplitude detector 2 includes a coupling capacitor C1 having one side connected to the output junction of the inverters in the oscillator and its other side connected in parallel to the cathode of a grounded diode D1 and the anode of a diode D2. The cathode of the diode D2 is connected to a grounded capacitor C2, a grounded resistor R1 and a capacitor C3. The capacitor C3 couples the detector 2 to a common junction of the resistors R2, R3 and R4 in the pulse-forming circuit 3.

The resistor R3 is connected in series with capacitor C3 to the positive input of a comparator K of the pulse-forming circuit 3, arranged in a Schmitt trigger configuration. A resistor R5 is connected between the positive input and the output of the comparator K. Thus, the resistors R3 and R5 form a positive feed-back path. The negative input of the comparator K is maintained at a "floating" level through a RC network consisting of the capacitor C3, the grounded resistor R2, the resistor R4 and the grounded capacitor C4. The common junction of the resistor R4 and capacitor C4 is connected to the negative input of the comparator K. Three inverters I4, I5 and I6 interconnected in parallel to the output of comparator K, have their common output junction connected to the output terminal 5 of the reading circuit arrangement as shown in FIG. 1.

Figure 2:
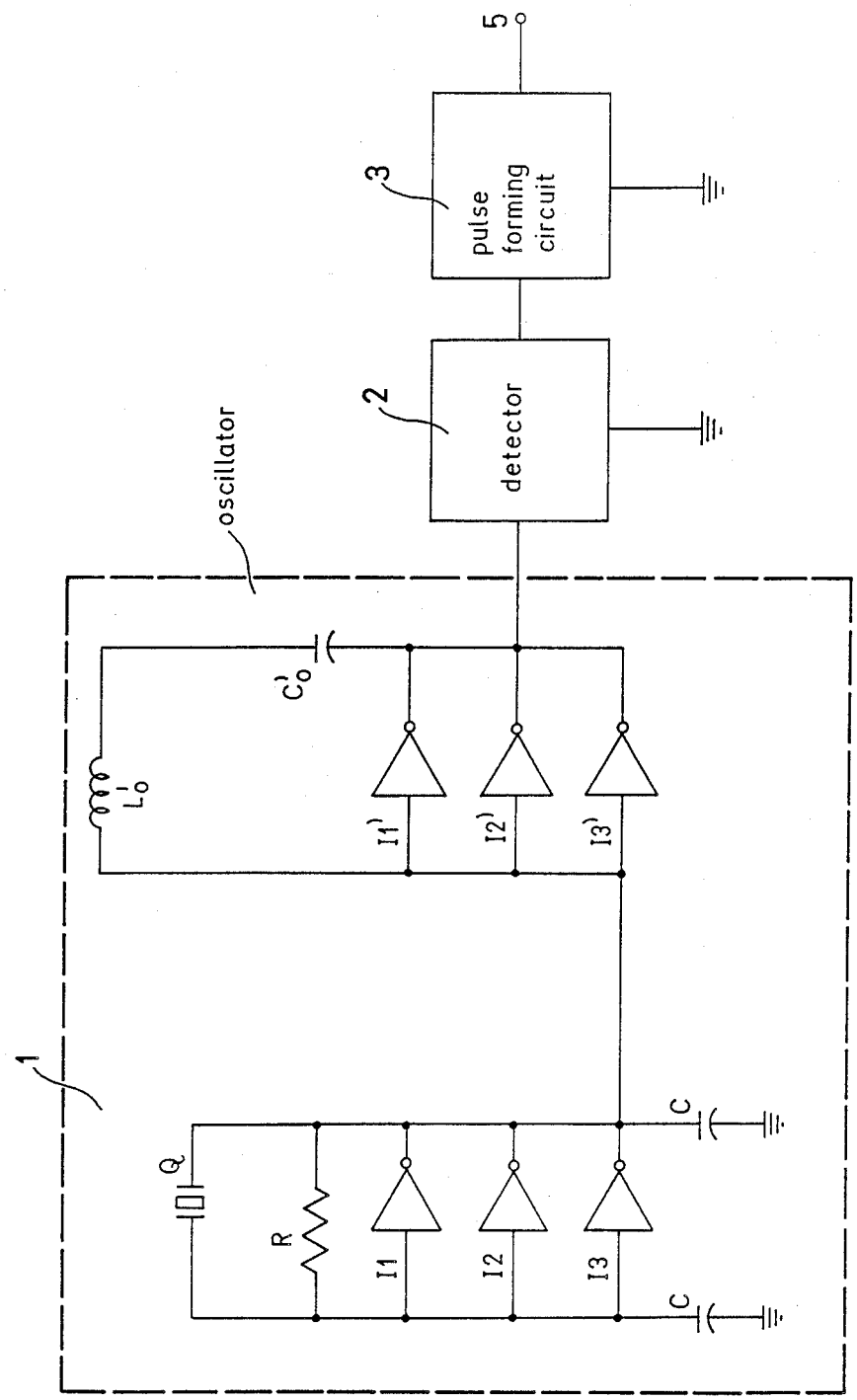
FIG. 2 is a circuit diagram of another embodiment showing a modification of the transmitting oscillator.

FIG. 2 illustrates another embodiment of the invention in which the oscillator 1' has a resonance circuit which includes a quartz crystal Q to achieve greater frequency stability and thereby meet the requirements of certain applications. In this embodiment, the inverters I1, I2 and I3 are also interconnected in parallel with a resistor R and a quartz crystal Q. Opposite terminals of the quartz crystal Q are connected by capacitors C to ground. The outputs of the inverters I1, I2 and I3 are connected to the inputs of three additional inverters I1', I2' and I3' connected in parallel with each other and to a feedback series connection formed by coil $L_o'$ and a capacitor $C_o'$. The outputs of said inverters I1', I2' and I3' are connected to the detector 2 and pulse-forming circuit 3 as hereinbefore described with respect to FIG. 1.

When the identification card 4 approaches the series oscillating circuit 1 or 1', its impedance is influenced through coil $L_o$ or $L_o'$ which results in a change in the output voltage amplitude. Through the detector 2 and the pulse-forming circuit 3, such changes are transformed into signals which appear at the output terminal 5 for computer processing through which the identification process is carried out.

To eliminate the influence of distance between the identification card 4 and the reading device on the identification process, another embodiment of the reading circuit arrangement was developed in accordance with the invention, as shown in FIG. 3. An oscillator 1'' is utilized consisting of a quartz crystal Q and a resistor R connected in parallel to an inverter I. The input and output of the inverter I are respectively coupled to ground through capacitors C. To the output of the inverter I, there are connected three inverters I1', I2' and I3' in parallel. The common output junction of the latter inverters is connected in series with a coil L1, an adjustable capacitor C5 and a grounded capacitor C6. To the junction of the capacitors C5 and C6, the detector 2 is coupled in series with pulse-forming circuit 3 as shown in FIG. 1. By means of adjustable capacitor C5, the resonance frequency of the quartz crystal Q is tuned to the identification card, to be inductively coupled to the oscillator 1'' through coil L1.

The reading circuit arrangements hereinbefore described avoid development of readouts at a certain threshold distance between the identification card and the reading device because of changing coupling factors between the transmitting and receiving circuits on the identification card. Thus, at such threshold distance the reading device does not detect the presence of the identification card.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A circuit arrangement of a device for reading electromagnetic identification cards, comprising an oscillator (1, 1', 1''), a detector (2) and a pulse-forming circuit (3), said oscillator including a resonance circuit having a resistor ($R_o$, R) a capacitor ($C_o$, $C_o'$, C5) and a coil $L_o$, $L_o'$, L1) operatively interconnected in series and parallel connected inverters (I1, I2, I3, I, I1', I2', I3') connected to the resistor, said inverters respectively having inputs and outputs, and capacitor means (C, C6) for interconnecting the inputs and outputs of the inverters with ground, said detector including a first coupling capacitor (C1) connected to said inverters of the oscillator, a grounded diode (D1), and coupling diode (D2), a first junction interconnecting the grounded diode and the coupling diode with said coupling capacitor, a first grounded capacitor (C2), a first grounded resistor (R1) and a second junction interconnecting the first grounded capacitor and the first grounded resistor with said coupling diode, said pulse-forming circuit including a second coupling capacitor (C3) connected to the second junction of the detector, a comparator (K) having positive and negative inputs and an output, a pair of resistors (R3, R4) respectively connected to said positive and negative inputs, a third junction interconnecting said pair of resistors with the second coupling capacitor, a second grounded resistor (R2) connected to said third junction, a second grounded capacitor (C4) connected to the negative input, a feedback resistor (R5) interconnecting the positive input and the output of the comparator, an output terminal (5) and a plurality of inverters (I4, I5, I6) interconnected in parallel between the output of the comparator and the output terminal.

2. The circuit arrangement of claim 1, including a quartz crystal (Q) connected in parallel with the resistor (R) and the inverters (I1, I2, I3) of the oscillator (1'), a plurality of additional inverters (I1', I2', I3') having inputs connected in parallel to the outputs of the first mentioned inverters and outputs connected in parallel to the detector and in series with the capcitor ($C_o'$) and the coil ($L_o'$) of the resonance circuit.

3. The circuit arrangement of claim 1 including a quartz crystal (Q) connected in parallel with the resistor (R) and one of the inverters (I) of the oscillator (1''), said capacitor means (C) of the oscillator interconecting the input and output of said one of the inverters to ground, the other of the inverters (I1', I2', I3') being interconnected in parallel between the output of said one of the inverters and the detector and in series with the coil (L1) and the capcitor (C5) of the resonance circuit and means for capacitively adjusting the capacitor of the resonance circuit, said capacitor means including a fourth junction between the adjustable capacitor of the resonance circuit and the first coupling capacitor (C1) of the detector and a grounded capacitor (C6) connected to said fourth junction.

4. A device for reading an electromagnetic card, comprising oscillator means for generating a signal at a frequency tuned to said card, detector means connected to the oscillator means for detecting a predetermined change in amplitude of the frequency tuned signal in response to inductive coupling between the card and the oscillator means and pulse-forming circuit means connected to the detector means for producing a readable output in response to said detection of the change in signal amplitude, said oscillator means including a resonance circuit through which the oscillator means is inductively coupled to the card, signal inverting means connected to the resonance circuit for transmitting the generated signal to the detector means and capacitor means for coupling the signal inverting means to ground.

5. The reading device as defined in claim 4 wherein said pulse-forming circuit means includes an output terminal, a comparator having a pair of inputs and an output, coupling means for separately connecting said inputs to the detector means, a feedback resistor interconnecting one of the inputs and the output of the comparator and signal inverting means for connecting the output of the comparator to the output terminal.

* * * * *